US012049772B2

(12) United States Patent
Horwood

(10) Patent No.: US 12,049,772 B2
(45) Date of Patent: Jul. 30, 2024

(54) LOCK ASSEMBLY

(71) Applicant: ASSA ABLOY NEW ZEALAND LIMITED, North Shore City (NZ)

(72) Inventor: Stuart Horwood, Auckland (NZ)

(73) Assignee: ASSA ABLOY New Zealand Limited, North Shore City (NZ)

( * ) Notice: Subject to any disclaimer, the term of this patent is extended or adjusted under 35 U.S.C. 154(b) by 0 days.

(21) Appl. No.: 16/720,376

(22) Filed: Dec. 19, 2019

(65) Prior Publication Data

US 2020/0224468 A1 Jul. 16, 2020

(30) Foreign Application Priority Data

Jan. 11, 2019 (NZ) ........................................ 749912

(51) Int. Cl.
*E05C 9/04* (2006.01)
*E05B 55/00* (2006.01)

(52) U.S. Cl.
CPC .............. *E05C 9/041* (2013.01); *E05B 55/00* (2013.01); *E05C 9/047* (2013.01); *E05Y 2201/722* (2013.01)

(58) Field of Classification Search
CPC ..... Y10T 292/546; E05C 9/041; E05C 9/047; E05C 9/006; E05C 9/04; E05C 9/00;
(Continued)

(56) References Cited

U.S. PATENT DOCUMENTS 2,787,154 A * 4/1957 Wesberry ................ E05C 9/048 70/118
4,802,352 A * 2/1989 Andreoli ................. E05B 17/04 70/118

(Continued)

FOREIGN PATENT DOCUMENTS

AU 714800 10/2001
AU 2004201336 10/2004

(Continued)

OTHER PUBLICATIONS

Fr2821380a1, Espacenet machine translation of description and claims, 2002-8-30 (Year: 2023).*

(Continued)

*Primary Examiner* — Kristina R Fulton
*Assistant Examiner* — Steven A Tullia
(74) *Attorney, Agent, or Firm* — Sheridan Ross P.C.

(57) ABSTRACT

A lock assembly comprising: one or more racks, each rack being configured to move along a linear axis between a respective extended position and a respective retracted position; and a drive hub coupled to the one or more racks; wherein the drive hub is configured such that, in an extended position of the one or more racks, the drive hub resists a linear force applied to a rack of the one or more racks from moving the rack towards the retracted position. A lock assembly comprising: one or more racks, each rack being configured to move along a linear axis between a respective extended position and a respective retracted position; and a drive hub having one or more engagement means, each engagement means configured to engage with the one or more racks; wherein in an extended position of the rack, at least one of the one or more engagement means is at an angle of less than 45° from the linear axis.

17 Claims, 7 Drawing Sheets

(58) Field of Classification Search
CPC ..... E05C 9/20; E05C 9/22; E05C 9/24; E05B 55/00; E05Y 2201/722
USPC ........... 292/32, 33, 37, 42; 70/1.5, 152, 118, 70/120, 129, 134
See application file for complete search history.

(56) References Cited

U.S. PATENT DOCUMENTS

| | | | |
|---|---|---|---|
| 5,765,410 | A | 6/1998 | Kwan et al. |
| 5,813,255 | A | 9/1998 | Tell, III et al. |
| 6,282,929 | B1 | 9/2001 | Eller et al. |
| 6,289,704 | B1 | 9/2001 | Collet et al. |
| 6,393,878 | B1 | 5/2002 | Fayngersh |
| 6,449,994 | B1 | 9/2002 | Kreyenborg |
| 6,739,162 | B1 | 5/2004 | Kondratuk |
| 6,813,915 | B2 | 11/2004 | Chang |
| 7,003,990 | B2 | 2/2006 | Iliuk |
| 7,334,438 | B2 | 2/2008 | Johansson et al. |
| 7,752,875 | B2 | 7/2010 | Constantinou et al. |
| 8,234,892 | B2 | 8/2012 | Laverty et al. |
| 8,534,100 | B2 | 9/2013 | Tsai |
| 8,875,549 | B2 | 11/2014 | Chang et al. |
| 8,882,162 | B2 | 11/2014 | Uyeda |
| 9,200,477 | B2 | 12/2015 | Duck |
| 9,222,286 | B2 | 12/2015 | Uyeda |
| 2004/0107746 | A1 | 6/2004 | Chang |
| 2004/0163431 | A1 | 8/2004 | Iliuk |
| 2004/0239121 | A1* | 12/2004 | Morris .................. E05B 13/004 292/39 |
| 2005/0092042 | A1 | 5/2005 | Constantinou et al. |
| 2005/0103066 | A1 | 5/2005 | Botha et al. |
| 2005/0229657 | A1 | 10/2005 | Johansson et al. |
| 2006/0185405 | A1 | 8/2006 | Middleton |
| 2007/0200368 | A1 | 8/2007 | Bauer |
| 2008/0022729 | A1 | 1/2008 | Middleton |
| 2009/0282877 | A1 | 11/2009 | Laverty et al. |
| 2010/0213724 | A1 | 8/2010 | Uyeda |
| 2010/0236302 | A1 | 9/2010 | Uyeda |
| 2011/0056254 | A1 | 3/2011 | Tsai |
| 2013/0152647 | A1 | 6/2013 | Terei et al. |
| 2013/0192315 | A1 | 8/2013 | Duck |
| 2013/0340492 | A1 | 12/2013 | Gendig et al. |
| 2014/0125068 | A1 | 5/2014 | Hagemeyer et al. |
| 2022/0034126 | A1 | 2/2022 | Zhao |

FOREIGN PATENT DOCUMENTS

| | | | | | |
|---|---|---|---|---|---|
| AU | 2004229071 | | | 6/2005 | |
| AU | 2009201895 | | | 11/2013 | |
| CN | 1884778 | | | 12/2006 | |
| CN | 2861405 | | | 1/2007 | |
| CN | 101298816 | | | 11/2008 | |
| CN | 101163761 | B1 | * | 10/2009 | ................ E05F 3/18 |
| CN | 202100063 | | | 1/2012 | |
| CN | 107083884 | A | * | 8/2017 | ............. E05C 9/021 |
| DE | 19911894 | A1 | * | 9/2000 | ............. E05C 9/021 |
| DE | 19929742 | A1 | * | 12/2000 | ............. E05C 9/066 |
| DE | 202007015503 | U1 | * | 3/2009 | ............. E05C 9/021 |
| DE | 202012104312 | U1 | * | 11/2012 | ............. E05C 9/041 |
| DE | 202013104877 | U1 | * | 12/2013 | ............. E05C 9/041 |
| EP | 0207869 | A1 | * | 1/1987 | ............. E05C 9/041 |
| EP | 0665353 | A1 | * | 8/1995 | ............. E05B 63/04 |
| EP | 1130205 | A1 | * | 9/2001 | ............. E05C 9/041 |
| EP | 2017415 | A2 | * | 1/2009 | ............. E05C 9/041 |
| FR | 2570744 | A1 | * | 3/1986 | ............. E05C 9/041 |
| FR | 2653155 | A1 | * | 4/1991 | ............. E05C 9/041 |
| FR | 2722826 | A1 | * | 1/1996 | ............. E05C 9/041 |
| FR | 2821380 | A1 | * | 8/2002 | ........... E05B 15/004 |
| GB | 1363050 | | | 8/1974 | |
| GB | 2257745 | A | * | 1/1993 | ............. E05C 9/041 |
| GB | 2303166 | A | * | 2/1997 | ............. E05C 9/041 |
| GB | 2322902 | | | 5/2001 | |
| GB | 2406876 | | | 4/2005 | |
| GB | 2406876 | | | 11/2005 | |
| GB | 2480787 | | | 11/2011 | |
| GB | 2480787 | | | 7/2014 | |
| WO | WO-9503468 | A1 | * | 2/1995 | ............. E05F 15/40 |
| WO | WO 97/33060 | | | 9/1997 | |
| WO | WO 98/16706 | | | 4/1998 | |
| WO | WO 2007/065200 | | | 6/2007 | |
| WO | WO 2010/107468 | | | 9/2010 | |
| WO | WO 2015/058254 | | | 4/2015 | |
| WO | WO 2017/154704 | | | 9/2017 | |
| WO | WO-2017158544 | A1 | * | 9/2017 | ........... A01K 1/0613 |

OTHER PUBLICATIONS

Official Action with English Translation for China Patent Application No. 202010023670.0, dated May 11, 2022, 16 pages.

International Search Report and Written Opinion for International (PCT) Patent Application No. PCT/NZ2019/050155, dated Mar. 3, 2020, 19 pages.

Official Action with English Translation for China Patent Application No. 201980079766.4, dated Apr. 6, 2022, 13 pages.

Official Action for U.S. Appl. No. 17/299,238, dated Sep. 21, 2023 10 pages.

* cited by examiner

LOCK ASSEMBLY

CROSS-REFERENCE TO RELATED APPLICATION

This application claims the benefit of New Zealand Patent Application No. 749912 filed 11 Jan. 2019, the entire contents of which are incorporated herein by reference in its entirety.

FIELD

This generally relates to a lock assembly.

BACKGROUND

A panel assembly, such as a door or window, may be provided with a lock. The lock enables the door or window to be selectively fixed into a closed position.

Some locks have a rack and gear arrangement. For example, a shootbolt may be attached to a rack, which is coupled to a gear. By rotating the gear with a handle, the shootbolt can be extended or retracted from the ends of the panel assembly.

SUMMARY

In a first example embodiment, there is provided a lock assembly comprising: one or more racks, each rack being configured to move along a linear axis between a respective extended position and a respective retracted position; and a gear coupled to the one or more racks; wherein the gear is configured such that, in an extended position of the one or more racks, the gear resists a linear force applied to a rack of the one or more racks from moving the rack towards the retracted position.

In a second example embodiment, there is provided a lock assembly comprising: one or more rack, each rack being configured to move along a linear axis between a respective extended position and a respective retracted position; and a gear having one or more teeth, each tooth configured to engage with the one or more racks; wherein in an extended position of the rack, at least one of the one or more teeth is at an angle of less than 45° from the linear axis.

BRIEF DESCRIPTION OF THE DRAWINGS

The invention is described by way of example with reference to the drawings, which show some embodiments of the invention. However, these are provided for illustration only. The invention is not limited to the particular details of the drawings and the corresponding description.

DETAILED DESCRIPTION

In some embodiments, a lock assembly for a panel assembly (such as a door or window) has shootbolts coupled to respective racks. The racks engage with a drive hub. A user can operate a handle to rotate the drive hub. When the drive hub is rotated, the racks move along a linear axis between extended and retracted positions. When the racks are extended, the drive hub resists a linear force applied to the rack in the retracting position from moving the rack towards the retracted position. This may be implemented by having engagement means (such as teeth of a gear or arms of a lever) of the drive hub at an angle of less than 45° from the linear axis when in the extended position. The racks can only be retracted through rotational movement of the drive hub. Thus only the handle can be used to retract the racks. This can improve the security of the lock assembly, since an intruder cannot force the racks to be retracted without using the handle.

Panel Assembly

Figure 1:
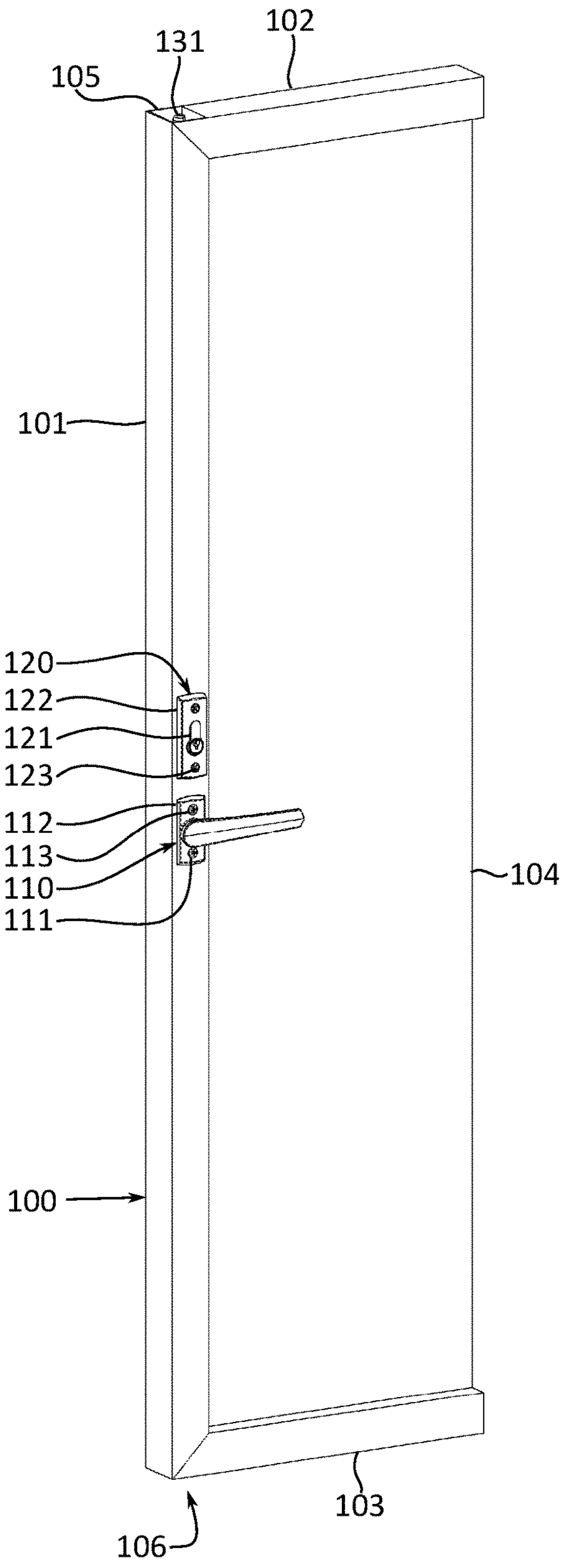
FIG. 1 shows an example panel assembly in an unlocked mode.
Figure 2:
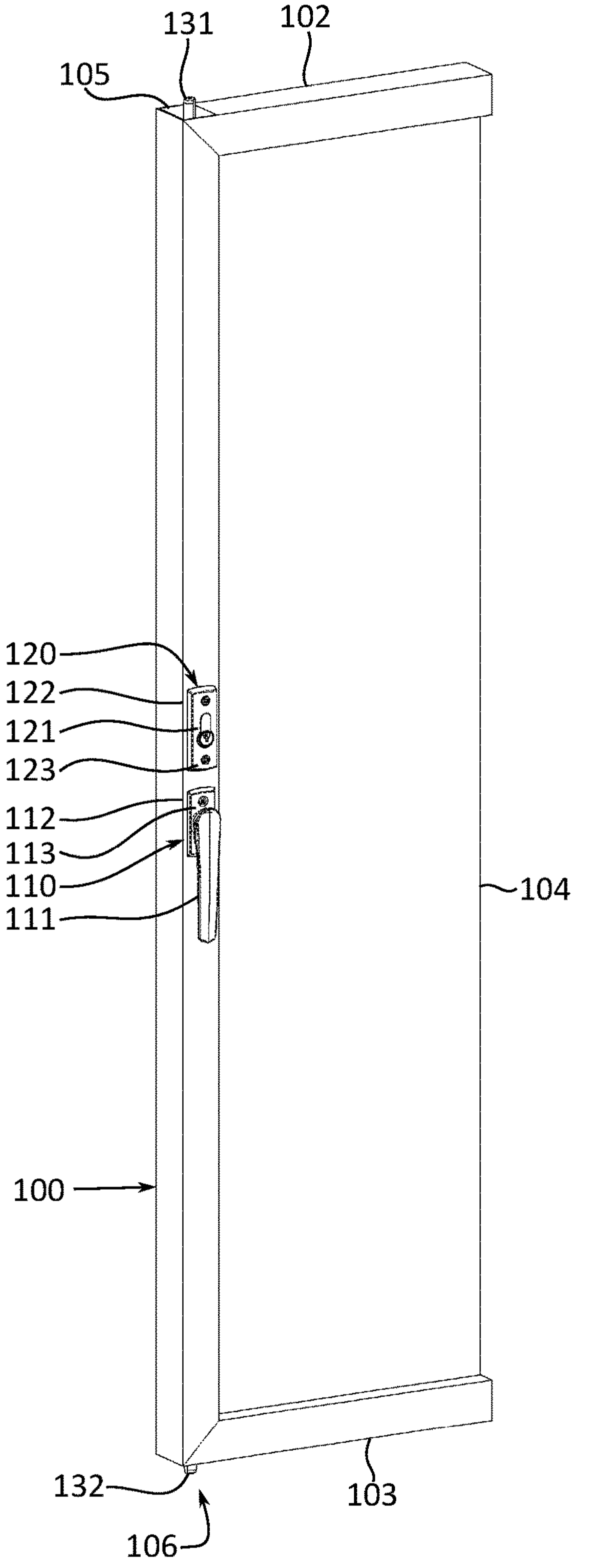
FIG. 2 shows the panel assembly in a locked mode.

FIGS. 1 and 2 show an example panel assembly which can use the described lock assembly. The depicted panel assembly is a door. Other panel assemblies, such as windows, may also use the lock assembly.

The door 100 has a lock stile 101, a top rail 102, and a bottom rail 103. The lock stile 101, top rail 102, and bottom rail 103 are commonly formed of metal (such as aluminium or steel), though other materials such as plastic or wood may be used. The lock stile 101, top rail 102, and bottom rail 103 may be formed integrally, or may be formed separately and joined by welding or another joining method. The lock stile 101, top rail 102, and bottom rail 103 retain a panel 104. The panel 104 is commonly formed of glass, though other materials such as metal, plastic, or wood may be used. A seal may be provided around the panel 104 to seal the panel 104 to the lock stile 101, top rail 102, and bottom rail 103.

The door shown in FIGS. 1 and 2 is a French door, and will typically have a hinge stile opposing the lock stile which mounts the door to a door frame using hinges. However, the panel assembly may be in different forms, including a French door or window, a bi-fold door or window, a sliding door or window, or a casement door or window.

The lock stile 101 has an internal space for receiving a lock assembly 200. For example, the lock stile 101 may be hollow. The lock assembly has a top shootbolt 131 and a bottom shootbolt 132 which can be extended or retracted. When the top shootbolt 131 and the bottom shootbolt 132 are extended, they pass through a top shootbolt opening 105 and bottom shootbolt opening 106 respectively in the lock stile 101. The top shootbolt 131 and the bottom shootbolt 132 then engage a strike plate in the head and sill of the door frame respectively. This couples the door 100 to the door frame, and prevents the door 100 from being opened. When the top shootbolt 131 and the bottom shootbolt 132 are retracted, they no longer extend through the top shootbolt opening 105 and bottom shootbolt opening 106. This allows the door 100 to move relative to the door frame.

The door 100 has a handle assembly 110 installed. The handle assembly 110 has a handle 111 which can be operated by a user between a locked and unlocked position. The handle 111 is coupled to the lock assembly 200, and can be used to extend and retract the top shootbolt 131 and bottom shootbolt 132. The handle 111 has a spindle which passes through a spindle opening in the lock stile 101. The spindle opening may be preformed or may be routed during installation. The spindle engages with the lock assembly 200. Once the handle 111 is installed, a handle escutcheon 112 is mounted over the handle 111 to cover the spindle opening and to mount the handle 111 to the door 100. The handle escutcheon 112 is fixed to the lock stile 101 with fasteners 113 (such as screws). In some cases, the handle escutcheon 112 is connected to or formed integrally with the handle 111.

FIG. 1 shows the door 100 where the handle 111 is in an unlocked position. This corresponds to the top shootbolt 131 and bottom shootbolt 132 being retracted, and the door is in an unlocked mode. The door 100 can therefore move relative to the door frame.

FIG. 2 shows the door 100 where the handle 111 is in a locked position. This corresponds to the top shootbolt 131 and bottom shootbolt 132 being extended, and the door is in a locked mode. The door 100 is therefore fixed to the door frame.

The door 100 may also have a cylinder lock assembly 120 installed. The cylinder lock assembly 120 has a cylinder lock 121 which can be turned when a matching key is inserted. In some cases, the cylinder lock 121 has a thumb turn or other hand- or finger-operable member which does not require a key. The cylinder lock 121 may be locked and unlocked. When the cylinder lock 121 is locked, the lock assembly 200 is deadlocked. This means that the top shootbolt 131 and the bottom shootbolt 132 are unable to be retracted, and consequently that the handle 111 is unable to move. The cylinder lock 121 is installed in a cylinder lock opening in the lock stile 101. The cylinder lock opening may be preformed or may be routed during installation. Once the cylinder lock 121 is installed, a cylinder lock escutcheon 122 is mounted over the cylinder lock 121 to cover the cylinder lock opening. The cylinder lock escutcheon 122 is fixed to the lock stile 101 with escutcheon fasteners 123 (such as screws). A cylinder lock 121 may be omitted in some cases.

By using the handle 111 and cylinder lock 121, a user can unlock the door (where the top shootbolt 131 and bottom shootbolt 132 are retracted), lock the door (where the top shootbolt 131 and bottom shootbolt 132 are extended, and the cylinder lock 121 is not locked), and deadlock the door (where the top shootbolt 131 and bottom shootbolt 132 are extended, and the cylinder lock 121 is locked).

Lock Assembly

FIGS. 3 to 9 show a lock assembly 200 according to some embodiments. The lock assembly 200 shown may be used with the door 100 shown in FIGS. 1 and 2, or with any other compatible panel assembly.

Figure 3:
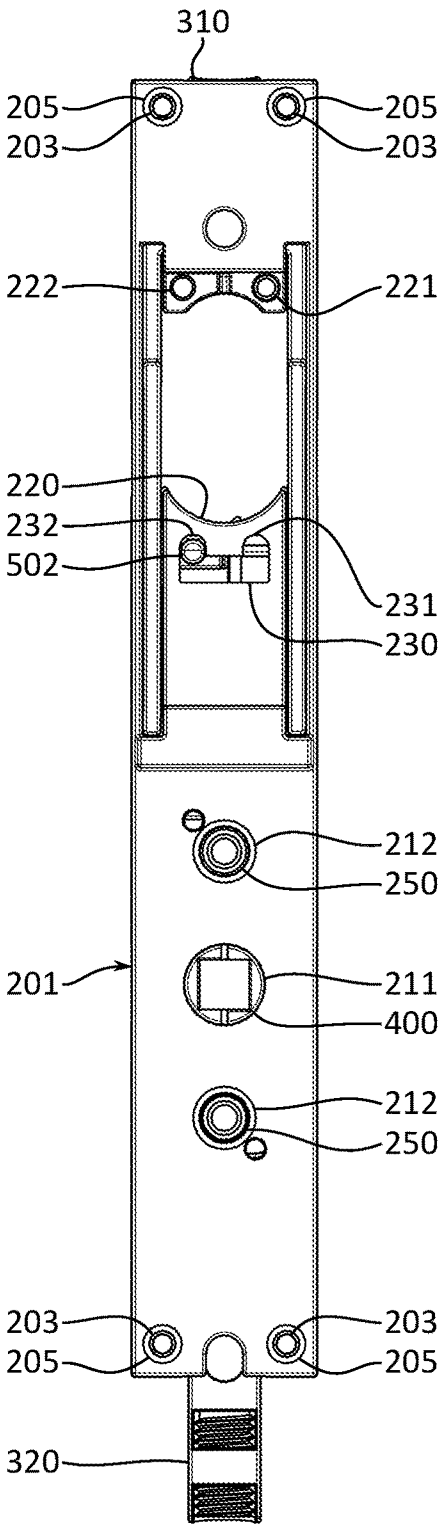
FIG. 3 shows an outside view of an example lock assembly in an unlocked mode.
Figure 4:
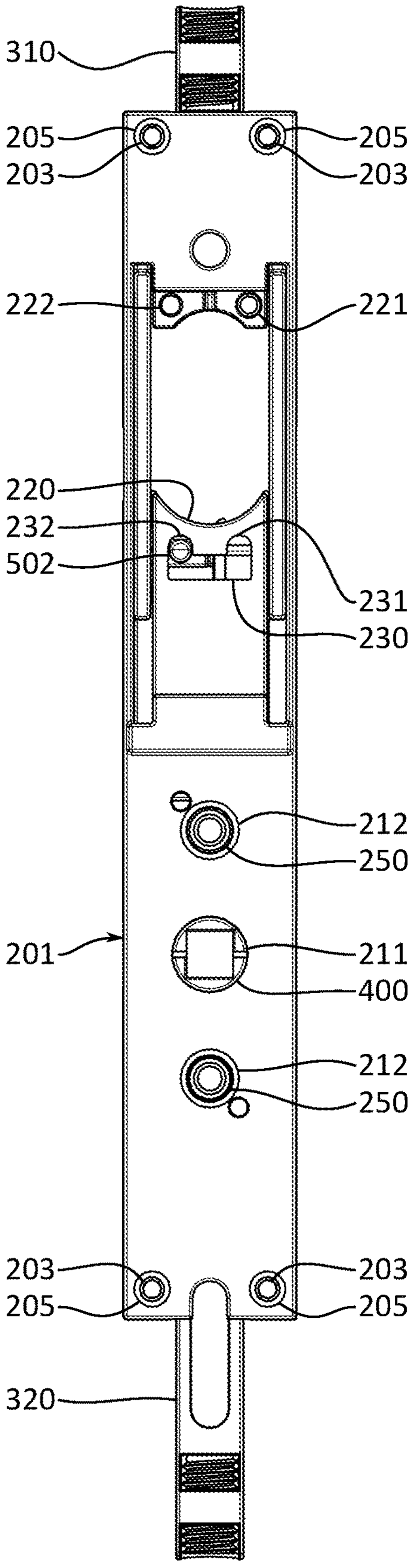
FIG. 4 shows an outside view of the lock assembly in a locked mode.

FIGS. 3 and 4 show an outer view of the lock assembly 200.

The lock assembly 200 has a front casing 201 and rear casing 202 which can be fixed together to hold internal components of the lock assembly 200.

Fixture pins 203 protrude from fixture pin blocks 204 of the rear casing 202. The fixture pins 203 are received by fixture pin apertures 205 of the front casing 201. The fixture pins 203 and fixture pin apertures 205 may have a relative snug or high-friction fit to retain the front casing 201 and the rear casing 202 together.

A spindle aperture 211 is provided in the front casing 201. The spindle aperture 211 is sized to allow a spindle of a handle 111 to pass into a drive hub 400. Fastener apertures 212 on either side of the spindle aperture 211 allow a fastener 113 of the handle 111 to be received by a corresponding fastener receiver 250 on the rear casing 202. A corresponding spindle aperture may be provided on the rear casing 202 to allow a handle to be operated from both sides.

A cylinder lock opening 220 is provided in the front casing 201 and rear casing 202. The cylinder lock opening 220 is configured to receive a cylinder lock 121. The cylinder lock 121 can be attached to the lock assembly 200 by a fixture post 221 configured to be received in a corresponding aperture and fastener aperture 222 configured to receive a fastener (such as a screw). The fixture post 221 and fastener aperture 222 may couple directly to the cylinder lock 121 or may engage with a cradle of the cylinder lock 121.

A guide 230 may be provided in the front casing 201. The guide 230 is U-shaped. A first arm 231 corresponds to the lock assembly 200 being deadlocked, and a second arm 232 corresponds to the lock assembly 200 not being deadlocked. The guide 230 is sized to receive a pin 502 of a cam follower 501. The pin 502 and the guide 230 assists in avoiding the deadlock being engaged or disengaged due to shaking.

A top rack 310 and bottom rack 320 have a top shootbolt receiver 311 and a bottom shootbolt receiver 321 respectively. The top shootbolt receiver 311 and bottom shootbolt receiver 321 may each have a screw thread or other mechanism to allow a top shootbolt 131 and bottom shootbolt 132 respectively to be coupled. In some cases, the top shootbolt receiver 311 is integral with top shootbolt 131 or the bottom shootbolt receiver 321 is integral with the bottom shootbolt 132. The top shootbolt 131 and bottom shootbolt 132 are omitted from the drawings for clarity.

FIG. 3 shows the lock assembly 200 in an unlocked mode. In the unlocked mode, the top rack 310 and the bottom rack 320 are in their retracted positions. This causes the top shootbolt 131 and the bottom shootbolt 132 to be in their retracted positions. A door having the lock assembly 200 in the unlocked mode would therefore be able to be opened.

FIG. 4 shows the lock assembly 200 is a locked mode. In the locked mode, the top rack 310 and the bottom rack 320 are in their extended positions. This causes the top shootbolt 131 and the bottom shootbolt 132 to be in their extended positions. A door having the lock assembly 200 in the locked mode would therefore fixed in place, as the top shootbolt 131 and bottom shootbolt 132 engage with corresponding strike plates.

Although the terms "top" and "bottom" are used in relation to top rack 310 and bottom rack 320, these only refer to one arrangement in which the top rack 310 is positioned higher than the bottom rack 320. This allows the top shootbolt 131 to be extended upwards and the bottom shootbolt 132 to be extended downwards to fix a door. This is not required, as any orientation of the top rack 310 and bottom rack 320 is possible. So, in some cases, the top rack 310 will be positioned lower than the bottom rack 320, with the top shootbolt 131 extending downwards and the bottom shootbolt 132 extending upwards. In other cases, the top rack 310 and bottom rack 320 may be substantially aligned, for example where the shootbolts are actuated horizontally for a window.

Figure 5:
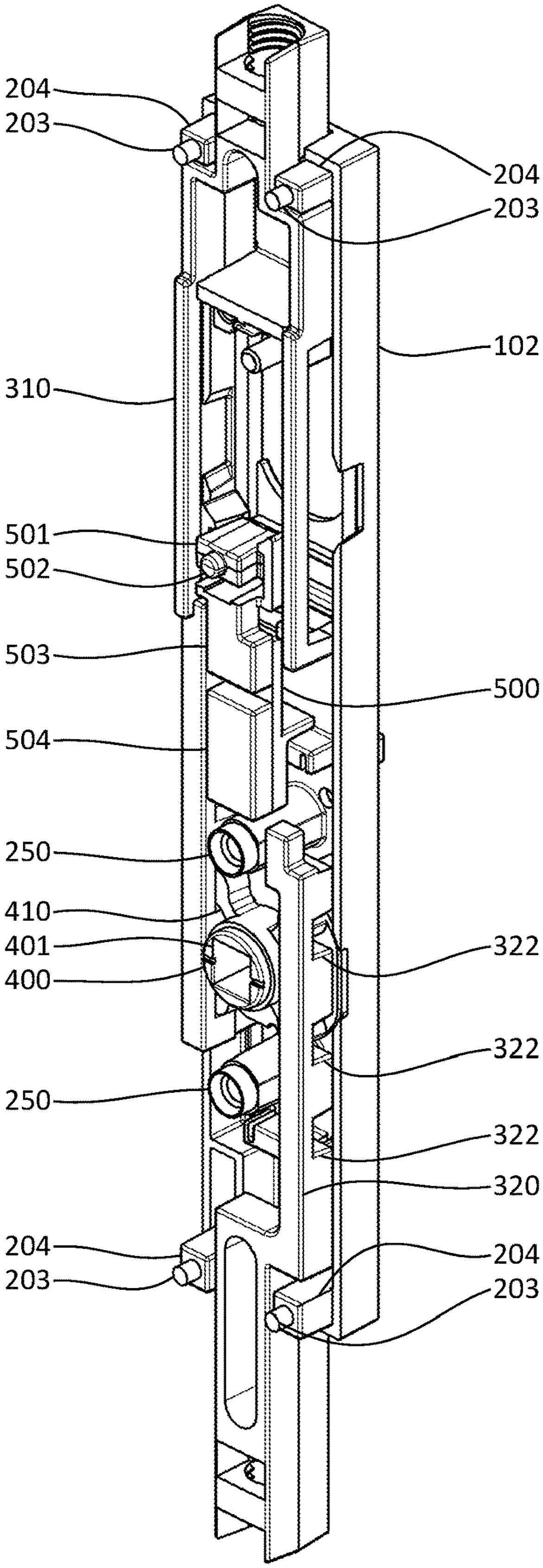
FIG. 5 shows an internal isometric view of the lock assembly.

FIG. 5 shows an isometric view of the lock assembly 200 without the front casing 201.

A drive hub 400 has a central aperture 401. The central aperture 401 is keyed to engage with a spindle of a handle assembly 110. For example, the central aperture 401 may have a square cross-section to engage with a spindle having a square cross-section. The drive hub 400 can rotate. The extent of rotation may be limited, such as to about 90°.

The drive hub 400 has one or more engagement means configured to engage with the top rack 310 or bottom rack 320. In the shown embodiment, the drive hub 400 is formed as a gear and has teeth 410 around its periphery, where the teeth are the engagement means. Each tooth 410 has a contoured shape defined by a proximal end 411, a narrow section 412, a broad section 413, and a distal end 414. The progression between the proximal end 411 and the narrow section 412, between the narrow section 412 and the broad section 413, and between the broad section 413 and the distal end 414 is gradual. This causes each of the teeth 410 to have a curved cross-section, which results in a relatively stronger tooth and a smoother operation in use. The drive hub 400 is coupled to the top rack 310 and bottom rack 320. This allows rotation of the drive hub 400 to cause movement of the top rack 310 and the bottom rack 320 simultaneously in opposing directions.

Each of the teeth 410 is configured to fit in one or more tooth slots 312 of the top rack 310 and/or one or more tooth slots 322 of the bottom rack 320. This couples the drive hub 400, top rack 310, and bottom rack 320 such that as the gear rotates, successive teeth of the gear engage successive slots of the rack to drive the rack along a linear axis.

The number of teeth 410 and the number of tooth slots 312, 322 may be varied depending on the desired extent of rotation of the drive hub 400 and the extent of linear movement of the top rack 310 and bottom rack 320. Four teeth 410, three tooth slots 312 of the top rack 310, and three tooth slots 322 of the bottom rack 320 may be sufficient to allow for 90° rotation of the drive hub 400.

The teeth 410 may not be evenly spaced around the periphery of the central aperture 401. For example, the pairs of adjacent teeth that engage the retracted top rack 310 or the retracted bottom rack 320 may have a first angular spacing (such as about 80°) and the pairs of adjacent teeth that engage the extended top rack 310 or the extended bottom rack 320 may have a second angular spacing (such as about 100°). Consequently, the tooth slots may not be spaced equidistantly. This may allow for the position of the teeth relative to the extended top rack 310 or bottom rack 320 to be configured.

The engagement between the teeth 410, the tooth slots 312 of the top rack 310, and the tooth slots 322 of the bottom rack 320 allows rotational movement of the drive hub 400 to cause linear movement of the top rack 310 and bottom rack 320. A user can rotate a handle which has spindle in the central aperture 401. Rotating the handle can therefore drive the top rack 310 and bottom rack 320 to move between extended and retracted positions, and thus for the lock assembly to move between locked and unlocked modes.

One benefit of drive hub 400, and in particular the configuration of teeth 410, is that the assembly is relatively compact. This may be useful for certain situations.

The lock assembly 200 has a deadlock 500. The deadlock 500 has a cam follower 501 which can move along a U-shaped path defined by the guide 230. As a cam of the cylinder lock 121 rotates, it pushes against the cam follower 501. This forces the cam follower 501 away from the cylinder lock 121 and out of one of the first arm 231 or second arm 232 of the guide 230, and then laterally across the lock assembly 200. Further rotation of the cam of the cylinder lock 121 causes the cam of the cylinder lock 121 to rotate out of contact with the cam follower 501. A biasing member (such as a spring) then causes the cam follower 501 to move into the other of the first arm 231 or the second arm 232 of the guide 230.

The deadlock 500 has a top deadlock block 503 and a bottom deadlock block 504. These may be formed integrally with the cam follower 501. As the cam follower 501 moves laterally across the lock assembly 200 towards the first arm 231, the top deadlock block 503 and bottom deadlock block 504 move in concert with the cam follower 501. In some cases, the top deadlock block 503 and the bottom deadlock block 504 are provided as a single integral block.

When the pin 502 of the cam follower 501 is in the first arm 231, the top deadlock block 503 is aligned with the top rack 310 and the bottom deadlock block 504 is aligned with the bottom deadlock block 504. If the top rack 310 or bottom rack 320 were attempted to be retracted, the top rack 310 would abut the top deadlock block 503 and the bottom rack 320 would abut the bottom deadlock block 504. This impedes the top rack 310 and bottom rack 320 from being retracted. In this way, the lock assembly is deadlocked.

When the pin 502 of the cam follower 501 is in the second arm 232, the top deadlock block 503 and the bottom deadlock block 504 are not aligned with the top rack 310 or bottom rack 320. The top rack 310 and bottom rack 320 are therefore able to be retracted. In this way, the lock assembly is not deadlocked.

Operation

Figure 6:
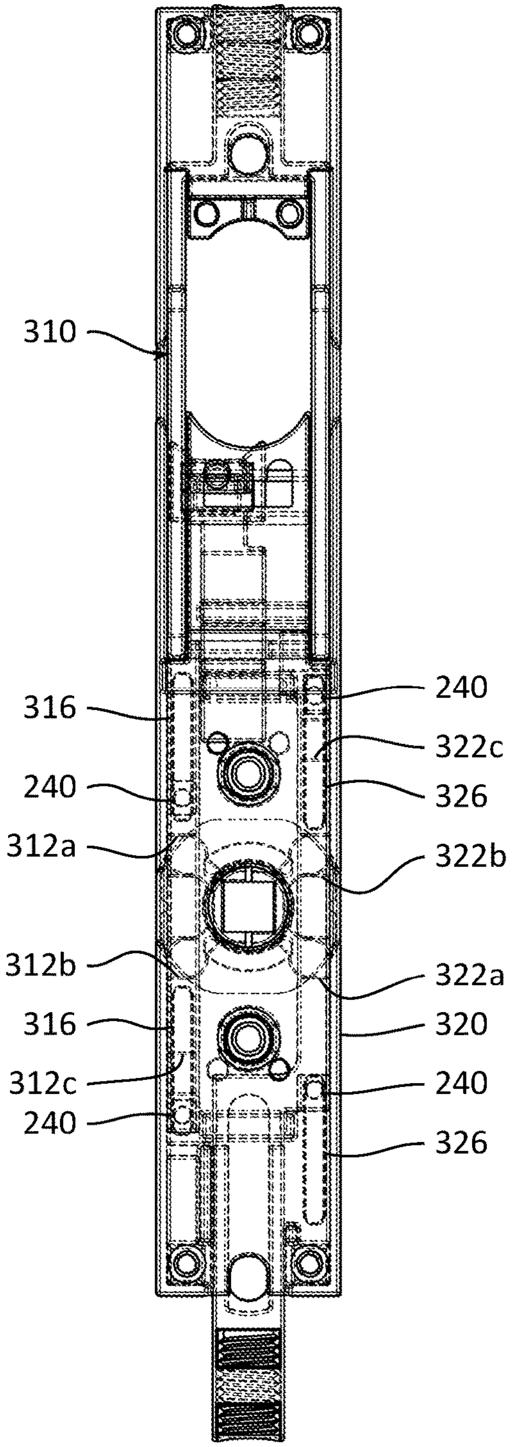
FIG. 6 shows a partially transparent view of the lock assembly in the unlocked mode.
Figure 7:
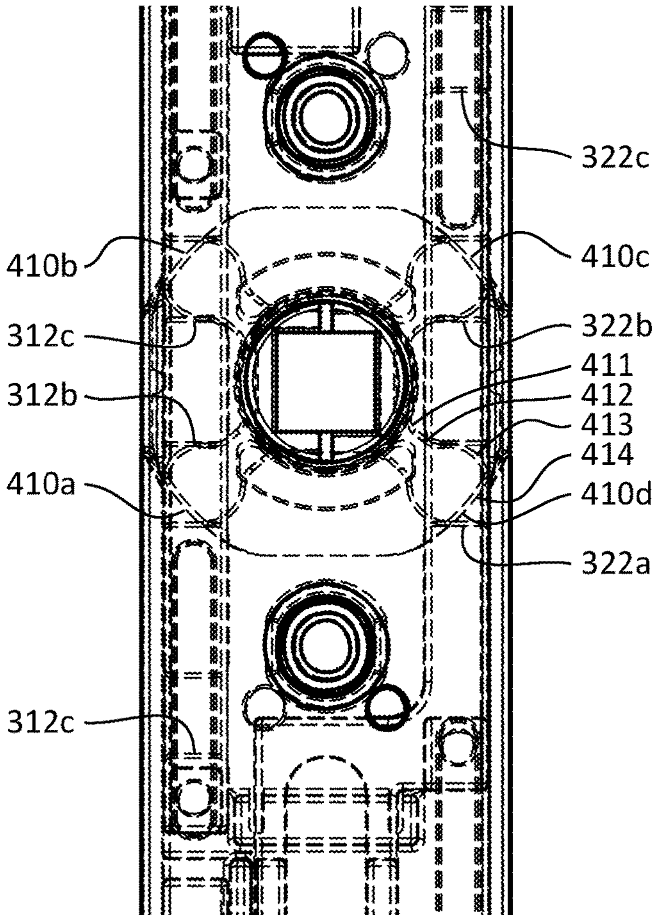
FIG. 7 shows an enlarged view around the drive hub of the lock assembly in the unlocked mode.

FIGS. 6 and 7 show the lock assembly in an unlocked mode. FIG. 7 is an enlarged view of the area surrounding the drive hub 400 of FIG. 6.

The top rack 310 is in the retracted position. Tooth 410*a* and tooth 410*b* are engaged in an adjacent pair of tooth slots 312*a*, 312*b*. Pins 240 of the casing of the lock assembly 200 sit at the end of linear channels 316 of the top rack 310.

The bottom rack 320 is in the retracted position. Tooth 410*c* and tooth 410*d*, separated by a relatively narrow angle of about 80°, are engaged in an adjacent pair of tooth slots 322*a*, 322*b*. Pins 240 of the casing of the lock assembly 200 sit at the end of linear channels 326 of the bottom rack 320.

Figure 8:
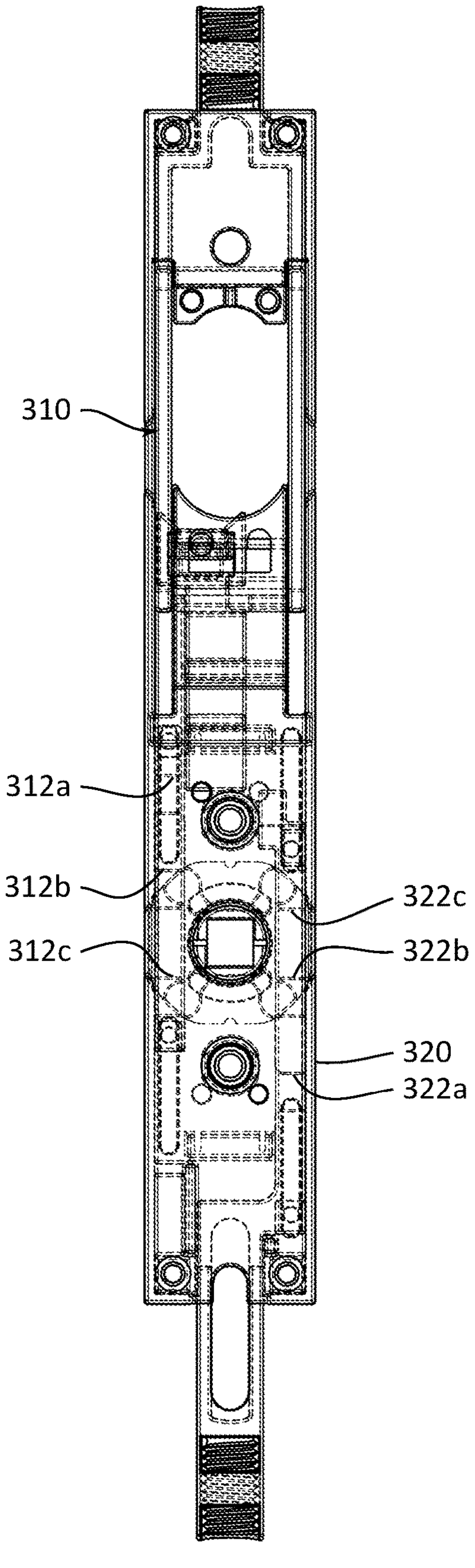
FIG. 8 shows a partially transparent view of the lock assembly in the locked mode.
Figure 9:
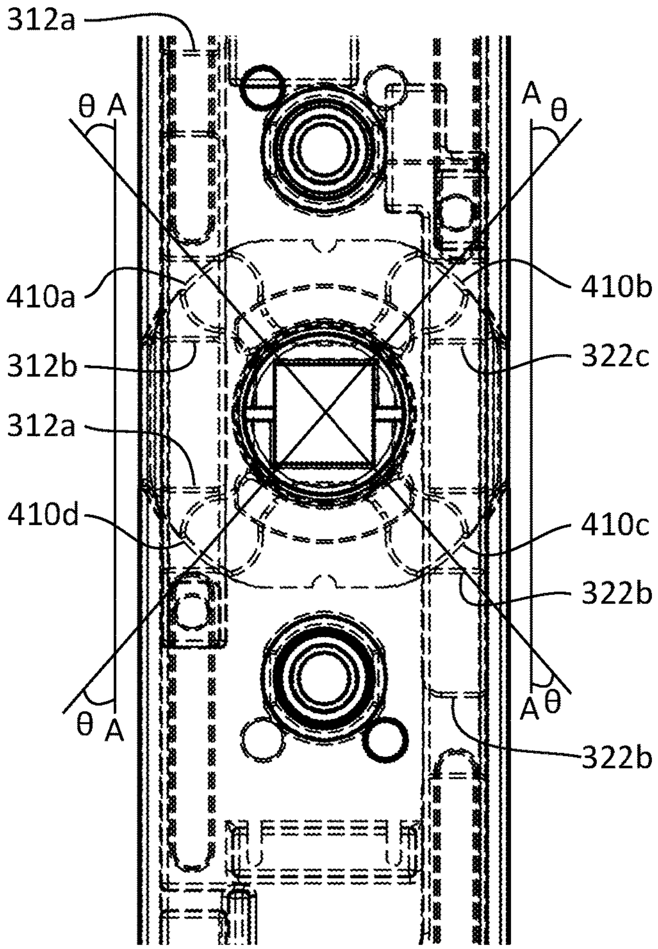
FIG. 9 shows an enlarged view around the drive hub of the lock assembly in the locked mode.

FIGS. 8 and 9 show the lock assembly in a locked mode. FIG. 9 is an enlarged view of the area surrounding the drive hub of FIG. 8.

The lock assembly moves from the unlocked mode of FIGS. 6 and 7 to the locked mode of FIGS. 8 and 9 by the drive hub 400 rotating about 90° clockwise. As the drive hub 400 rotates, the teeth 410 of the drive hub 400 force the top rack 310 and bottom rack 320 to move linearly along axis A-A. The extent of the linear movement corresponds to the movement of the pins 240 within the linear channels 316, 326.

During the rotation, tooth 410*a* and tooth 410*c* leave tooth slot 312*a* and tooth slot 322*a* respectively, and enter tooth slot 322*c* and tooth slot 312*c* respectively. At the end of the rotation, the walls of each slot entering the narrow section 412 of each of the teeth 410 may operate as a detent, and provide tactile feedback of the end of the rotation to the user.

After the rotation, the top rack 310 is in the extended position. Tooth 410*b* and tooth 410*c* are at an angle θ relative to the linear axis A-A. The bottom rack 320 is also in the extended position. Tooth 410*d* and tooth 410*a* are at an angle θ relative to the linear axis A-A. The angle θ is less than 45°, and may be about 40°.

Because the angle θ is less than 45° relative to the linear axis A-A, any linear force along linear axis A-A on the top rack 310 or bottom rack 320 will not result in the movement of the top rack 310 or bottom rack 320 back towards the retracted position. For example, if a linear external force is applied to bottom rack 320 in the retracting direction (to try and retract bottom rack 320), the distal end 414 of tooth 410*c* pushes against the face of the slot 322*b*. The contact between these two and the angle θ being less than 45° resists the linear movement being translated to anti-clockwise rotation of the gear. This therefore resists retraction of the rack 320. Similarly, the top rack 310 resists a linear force towards the retracted position for the same reason. The top rack 310 and bottom rack 320 can therefore only be retracted by rotation of the drive hub 400 (such as through operation of a handle).

In this way, an intruder cannot attempt to force the shoot bolts to be retracted. This may result in a higher security lock assembly. This can occur even if a deadlock is not engaged, or if a deadlock is not present.

Lever

Figure 10:
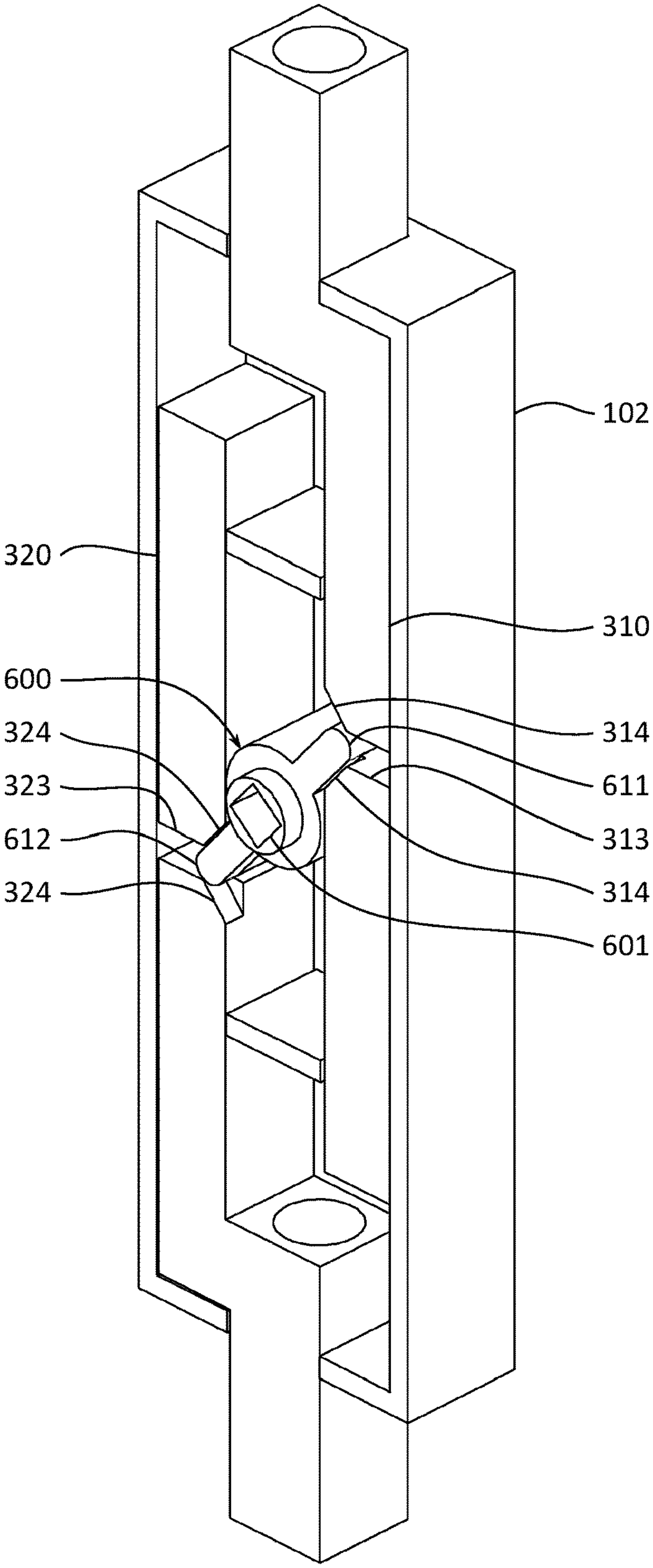
FIG. 10 shows an isometric view of a second example lock assembly.
Figure 11:
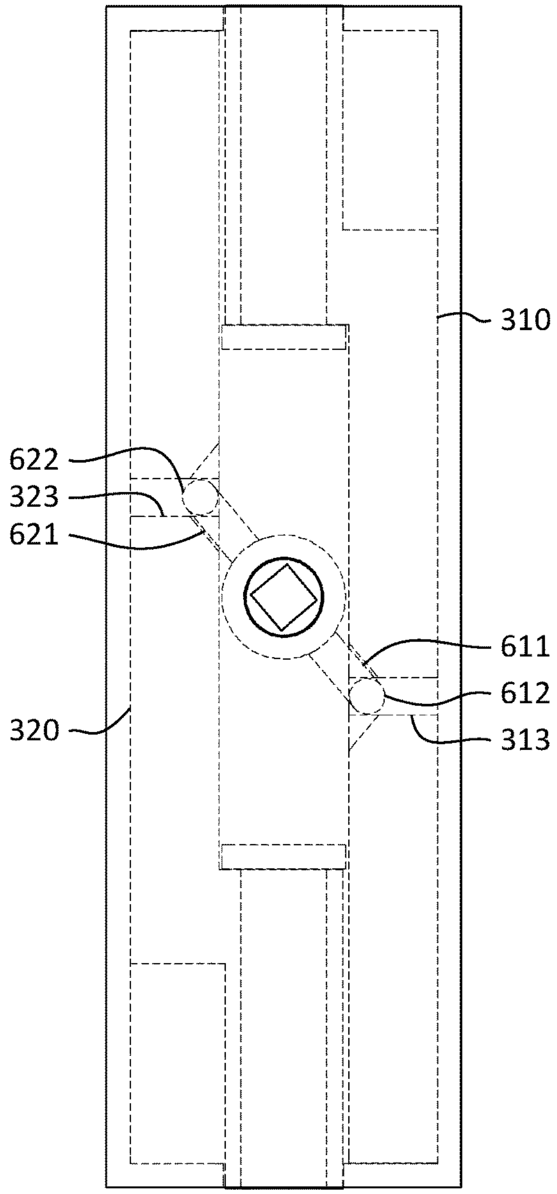
FIG. 11 shows the second example lock assembly in an unlocked mode.
Figure 12:
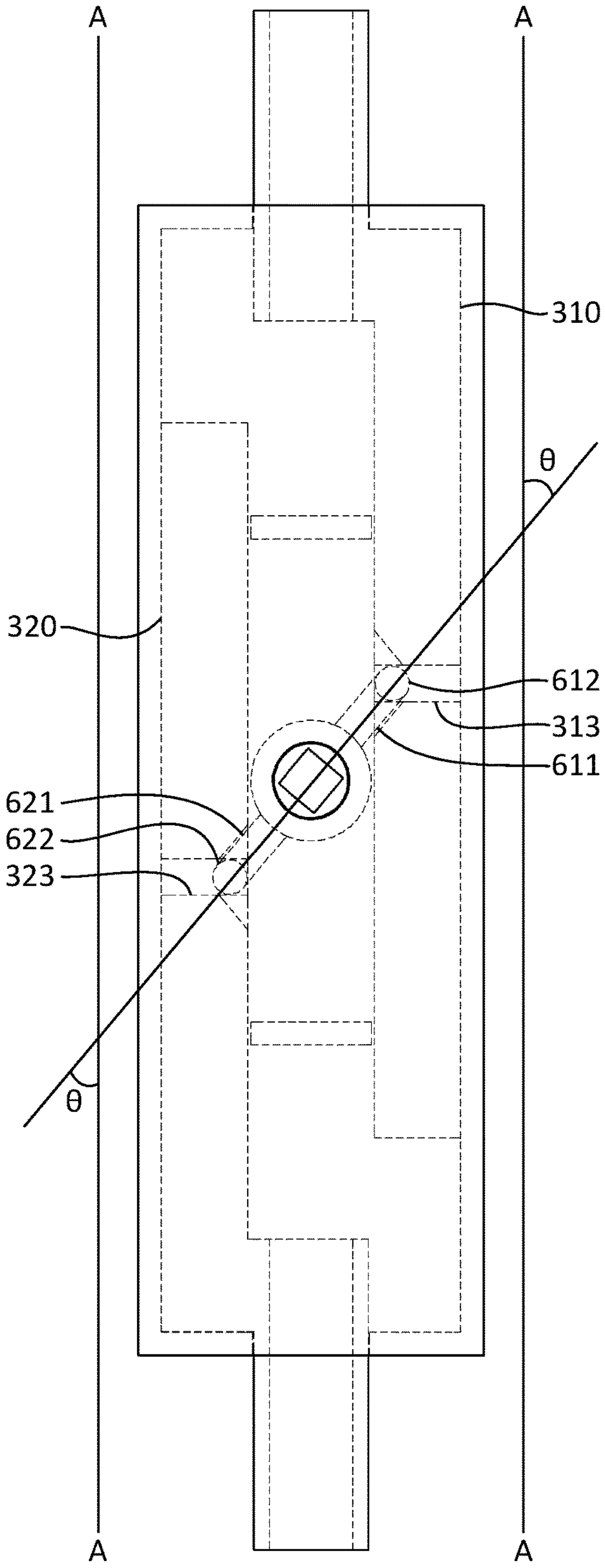
FIG. 12 shows the second example lock assembly in a locked mode.

FIGS. 10 to 12 show a second example embodiment of a lock assembly in which the drive hub 600 is formed as a lever. FIGS. 10 to 12 are simplified, in that they omit many of the features of FIGS. 3 to 9 in order to highlight the operation of the drive hub 600.

The drive hub 600 is similar to the drive hub 400, in that drive hub 600 has a central aperture 601 keyed to engage with a spindle of a handle assembly 110. The same handle assembly 110 may be used with either drive hub arrangement.

The lever has two arms 611, 621 on opposite sides of the drive hub 600. A pin 612, 622 protrude from the end of each arm 611, 621. In some cases, the pins 612, 622 are omitted.

The pins 612, 622 are able move laterally within slots 313, 323 of the top rack 310 and bottom rack 320 respectively. The slots 313, 323 are a relatively snug fit along the axis A-A but allow the pins 612, 622 free movement laterally. In this arrangement, as the drive hub 600 rotates, the pins push against a wall of the slots 313, 323 to drive the top rack 310 and bottom rack 320 along axis A-A. The slots 313, 323 allow the pins 612, 622 to move laterally through this process, to account for the lateral movement of the pins 612, 622 through their rotation.

The corners 314, 324 of the slots 313, 323 may be chamfered, which allows a greater rotation of the drive hub 600 before the arms 611, 621 contact the top rack 310 or bottom rack 320.

FIG. 11 shows the lock assembly in an unlocked mode.

The top rack 310 and bottom rack 320 are in the retracted position. Arm 611 and pin 612 are located within slot 313 of the top rack 310, and arm 621 and pin 622 are located within the slot 323 of the bottom rack 320.

FIG. 12 shows the lock assembly in a locked mode. In the locked mode, the top rack 310 and the bottom rack 320 are in the extended position. This allows connected shootbolts to be in their corresponding extended positions.

The lock assembly moves from the unlocked mode to the locked mode by the drive hub 600 being rotated. This may occur by a user operating a handle having a spindle in the central aperture 601. The extent of rotation between the unlocked mode and the locked mode may be about 90°.

During the rotation arm 611 and pin 612 push against the walls of the slot 313. This drives the top rack 310 along axis A-A. Arm 621 and pin 622 push against the walls of the slot 323, which drives the bottom rack 320 along A-A in the opposite direction. In this way, rotation of the drive hub 600 drives linear movement of the top rack 310 and bottom rack 320.

After the rotation, the top rack 310 and bottom rack 320 are in their respective extended positions. The arms 611, 621 are at an angle θ relative to the linear axis A-A. The angle θ is less than 45°, and may be about 40°.

Because the angle θ is less than 45° relative to the linear axis A-A, any linear force along linear axis A-A on the top rack 310 or bottom rack 320 will not result in the movement of the top rack 310 or bottom rack 320 back towards the retracted position. For example, if a linear external force is applied to bottom rack 320 in the retracting direction (to try and retract bottom rack 320), the pin 622 and pushes against slot 323. The contact between these two and the angle θ being less than 45° resists the linear movement being translated to clockwise rotation of the drive hub. This therefore resists retraction of the rack 320. Similarly, the top rack 310 resists a linear force towards the retracted position. The top rack 310 and bottom rack 320 can therefore only be retracted by rotation of the drive hub 600 (such as through operation of a handle).

Drive hub 600 is therefore an alternative arrangement to drive hub 400 which provides similar security features. A benefit of drive hub 600 may be that it has a relative simple and low-cost design.

INTERPRETATION

The term "comprises" and other grammatical forms is intended to have an inclusive meaning unless otherwise noted. That is, they should be taken to mean an inclusion of the listed components, and possibly of other non-specified components or elements.

The present invention has been illustrated by the description of some embodiments. While these embodiments have been described in detail, this should not be taken to restrict or limit the scope of the claims to those details. Additional advantages and modifications will readily appear to those skilled in the art. Therefore, the invention in its broader aspects is not limited to the specific details of the illustrative examples shown and described. Accordingly, modifications may be made to the details without departing from the spirit or scope of the general inventive concept.

What is claimed is:

1. A lock assembly comprising:

one or more racks, each rack being configured to move along a linear axis between a respective extended position and a respective retracted position; and a drive hub coupled to the one or more racks;

wherein the drive hub is configured such that, in an extended position of the one or more racks, the drive hub resists retraction of the one or more racks both by friction and by resisting linear movement of the one or more racks being translated to rotation of the drive hub;

wherein the drive hub comprises a gear having one or more teeth, each tooth being configured to engage with a respective one of the one or more racks;

wherein in the extended position of the one or more racks, a pair of teeth in engagement with the rack have a first angular spacing that is greater than 90° between the teeth;

wherein in a retracted position of the one or more racks, a pair of teeth in engagement with the rack have a second angular spacing that is less than 90° between the teeth; and wherein each tooth has a contoured shape defined by a proximal end, a distal end, and a narrow section between the proximal end and the distal end, the narrow section being narrower in cross-sectional width than the proximal end and the distal end.

2. The lock assembly of claim 1, wherein the drive hub is configured such that, in an extended position of each rack, rotation of the drive hub causes each rack to move along the linear axis towards the retracted position.

3. The lock assembly of claim 1, wherein the one or more racks comprise a first rack and a second rack, wherein the first rack and the second rack are configured to move in opposite directions from their respective extended positions to their respective retracted positions.

4. The lock assembly of claim 1, wherein the drive hub is configured such that rotation of the gear drives each rack along the linear axis.

5. The lock assembly of claim 1, wherein each rack comprises a plurality of slots, each slot being configured to receive one of the teeth of the gear such that as the gear rotates, successive teeth of the gear engage successive slots of the rack to drive the rack along the linear axis.

6. The lock assembly of claim 5, wherein when each rack moves into the respective extended position, a slot of the rack operates as a detent for a respective tooth.

7. The lock assembly of claim 1, wherein the drive hub comprises a lever having one or more arms, each arm being in communication with a respective one of the one or more racks.

8. The lock assembly of claim 7, wherein each rack comprises a slot configured receive a pin of a corresponding arm, wherein as the rack moves between an extended position and a retracted position, the pin moves laterally within the slot.

9. The lock assembly of claim 1 comprising:

wherein the drive hub comprises one or more engagement means, each engagement means configured to engage with the one or more racks;

wherein in an extended position of the one or more racks, at least one of the one or more engagement means is in engagement with a rack of the one or more racks and is at an angle of less than 45° from the linear axis;

wherein the effect of both friction and the angle of less than 45° from the linear axis between one or more engagement means in engagement with the one or more racks resist movement of the one or more racks along the linear axis;

wherein the drive hub comprises a lever having one or more arms, each arm being an engagement means configured to engage with a respective one of the one or more racks; and wherein each rack comprises a slot configured receive a pin of a corresponding arm, wherein as the rack moves between an extended position and a retracted position, the pin moves laterally within the slot along a linear path that is substantially perpendicular to the linear axis.

10. The lock assembly of claim 9, wherein the at least one of the one or more engagement means is at an angle of about 40° from the linear axis.

11. The lock assembly of claim 9, wherein the drive hub is configured such that rotation of the drive hub drives each rack along the linear axis.

12. The lock assembly of claim 11, wherein rotation of the drive hub in a first angular direction causes the one or more racks to move along the linear axis towards respective extended positions, and rotation of the drive hub in a second angular direction causes the one or more racks to move along the linear axis towards respective retracted positions.

13. The lock assembly of claim 12, wherein the drive hub is configured to rotate in response to operation of a handle.

14. The lock assembly of claim 9, wherein the one or more racks comprise a first rack and a second rack, wherein the first rack and the second rack are configured to move in opposite directions from their respective extended positions to their respective retracted positions.

15. The lock assembly of claim 9, wherein the drive hub comprises a gear having one or more teeth, each tooth being an engagement means configured to engage the one or more racks.

16. The lock assembly of claim 15, wherein each rack comprises a plurality of slots, each slot being configured to receive one of the teeth of the gear such that as the gear rotates, successive teeth of the gear engage successive slots of the rack to drive the rack along the linear axis.

17. The lock assembly of claim 16, wherein when each rack moves into the respective extended position, a slot of the rack operates as a detent for a respective tooth.

* * * * *